United States Patent [19]

Bush et al.

[11] Patent Number: 4,685,535
[45] Date of Patent: Aug. 11, 1987

[54] MOBILE REMOTE MANIPULATOR VEHICLE SYSTEM

[75] Inventors: Harold G. Bush, Yorktown; Martin M. Mikulas, Jr., Poquoson; Richard E. Wallsom, Newport News; J. Kermit Jensen, Hayes, all of Va.

[73] Assignee: The United States of America as represented by the Administrator of the National Aeronautics and Space Administration, Washington, D.C.

[21] Appl. No.: 760,799

[22] Filed: Jul. 31, 1985

[51] Int. Cl.⁴ .................................................. E04G 3/10
[52] U.S. Cl. ........................................ 182/63; 182/82; 182/223
[58] Field of Search .............. 182/82, 150, 36, 63, 182/65–67, 223, 12, 13, 37, 39, 84, 222

[56] References Cited

U.S. PATENT DOCUMENTS

| 1,798,070 | 3/1931 | Dean | 182/65 |
|---|---|---|---|
| 3,063,514 | 3/1961 | Hiyama . | |
| 3,072,217 | 1/1963 | Hiyama . | |
| 3,176,792 | 4/1965 | Olson . | |
| 3,384,201 | 5/1968 | Fulton | 182/2 |
| 3,400,502 | 9/1968 | Scaggs et al. . | |
| 3,741,143 | 6/1973 | McKinley | 182/2 |
| 3,774,719 | 11/1973 | Lindsay | 182/223 |
| 3,817,384 | 6/1974 | Jones | 182/223 |
| 3,825,096 | 7/1974 | Mendes | 182/82 |
| 3,910,439 | 10/1975 | Ross et al. . | |
| 4,020,921 | 5/1977 | Rawlings . | |
| 4,095,670 | 6/1978 | Martin . | |
| 4,121,690 | 10/1978 | Rawlings et al. . | |

FOREIGN PATENT DOCUMENTS

419606  10/1974  U.S.S.R. ............................... 182/223

Primary Examiner—Reinaldo P. Machado
Assistant Examiner—Alvin Chin-Shue
Attorney, Agent, or Firm—George F. Helfrich; Wallace J. Nelson; John R. Manning

[57] ABSTRACT

A mobile remote manipulator system 10 is disclosed for assembly, repair and logistics transport on, around and about a space station square bay truss structure. The vehicle is supported by a square track arrangement supported by guide pins integral with the space station truss structure 12 and located at each truss node 40. Propulsion is provided by a central push-pull drive mechanism 20 that extends out from the vehicle one full structural bay over the truss and locks drive rods 38 into the guide pins 30. The draw bar is now retracted and the mobile remote manipulator system is pulled onto the next adjacent structural bay. Thus, translation of the vehicle is "inchworm" style. The drive bar can be locked onto two (2) guide pins while the extendable draw bar is within the vehicle and then push the vehicle away one bay providing bi-directional push-pull drive. The track switches 28 allow the vehicle to travel in two (2) orthogonal directions over the truss structure which coupled with the bi-directional drive, allow movement in four (4) directions on one plane. The top layer of this tri-layered vehicle is a logistics platform 16. This platform is capable of 360 degrees of rotation and will have two (2) astronaut foot restraint platforms 18 and a space crane 14 integral.

14 Claims, 13 Drawing Figures

MOBILE REMOTE MANIPULATOR VEHICLE SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2357).

BACKGROUND OF THE INVENTION

This invention relates to the field of work platforms. More particularly, the invention is directed toward an apparatus for assembly, repair and logistic transportation of, on and about a large truss structure. The immediate contemplated use and the impetus behind development is the construction of the National Aeronautics and Space Administration planned space station.

Preliminary studies conducted by the Natinal Aeronautics and Space Administration (NASA), on space station construction have identified the need for a mobile remote manipulator vehicle system. Such a logistics or utility device is envisioned to be outfitted with a spacecrane capability such as that utilized currently in the space shuttle cargo bay. At this stage of development it is thought that the presently employed shuttle remote manipulator system could be outfitted with a quick-disconnect from the shuttle fuselage and then used as the space crane on the mobile remote manipulator vehicle system. It is also probable that the mobile remote manipulator vehicle system will have two astronaut foot restraint positioning arms.

This mobile remote manipulator vehicle system is required during initial space station construction activities to position astronauts for manned extravehicular activity (EVA) assembly of the truss structure. It is also requisite to transport modules and pay loads from the shuttle cargo bay and position them for attachment to the truss structure. Subsequent to the initial space station construction activities, a mobile remote manipulator vehicle system is considered necessary for maintenance or repair activities and to provide a construction capability for future station growth or large space craft assembly and servicing. While the embodiment of the mobile remote manipulator vehicle system chosen for illustration is one designed for on-orbit zero gravity trusses, the invention is equally adaptable for one-gravity terrestrial applications where large truss structures might be employed.

The square bay truss structure of the planned space station suggest the need for a mobile remote manipulator vehicle system which can move in two orthogonal directions. This capability permits movement both along the space station keel structures between the modules and the solar array support structure as well as perpendicular along the solar array support booms. It is also desirable to optimize work area flexibility by providing a logistics platform capable of 360 degree rotation so as to maximize ability to work around the inexorably increasing attachments on a space station. An additional mobility requirement is a reversible drive which in effect expands the ability to move in two orthogonal directions to four and abrogates the possibility of trapping the mobile remote manipulator vehicle system in a corner.

Theoretically, a mobile remote manipulator vehicle system could be mounted on rails affixed to the space station truss structure. This would allow transition in a single orthogonal direction and involve complete detachment and reattachment to move in a perpendicular direction. Mounting rails onto the space station truss structure introduces additonal mass and significant design complexity which also must be considered. Positioning rails on the mobile remote manipulator system (instead of the truss) which "ride" on the truss hard points is possible. However, endless tracks (chains or belts) which provide mobility in this case must completely span two truss bays to ensure stability of the mobile remote manipulator system during motion. Such an arrangment avoids the mass and complexity of rails attached to the space truss structure but movement in a perpendicular direction is not enhanced. Also the undesirable feature of a system that must be two bays in length is introduced.

With the space shuttle program the only means of transporting the logistics to the on-orbit environment, packaging parameters must conform to the dimensions of the shuttle cargo bay. This is true for the logistics required to construct the space station as well as the mobile remote manipulator vehicle system. This limitation indicates a mobile remote manipulator vehicle that is no longer than one space truss bay in length. Limiting the dimensions to one truss bay will enhance usefulness for maintenance and construction activities, particularly in close proximity to the modular habitat or surface attached equipment.

A final design requirement for a viable mobile remote manipulator vehicle system is a drive system that utilizes electrical energy so as to be compatible with space station solar power. The system should employ rechargeable batteries and avoid umbilical cords. Control of all features of the mobile remote manipulator vehicle system should reside with the Extravehicular Activity Astronaut(s) to avoid hardline or remote system control links to a control station.

OBJECTS

Accordingly, it is an object of this invention to provide a machine capable of moving from point to point on a space station truss structure.

It is another object to provide a machine capable of transporting astronauts and logistics outside a square space station truss beam on one side while leaving two sides free for supporting solar power arrays and the fourth for supporting thermal radiators.

It is yet another object of the present invention to provide a machine capable of providing a work platform for constructing the space station by sequentially adding truss modules bay by bay.

It is another object of the invention to provide a work platform with an attached "space crane" for positioning payloads while the Extra Vehicular astronauts attach the equipment to the structure.

It is also an object of the present invention to provide a mobile assembly and transport vehicle capable of facilitating assembly of large space structures such as communication antenna and astronomical observatories.

It is also an object of the present invention to provide a mobile work platform capable of space station maintenance including single module removal and/or addition.

It is yet another object of the present invention to provide a transport platform to carry astronauts from a docking space shuttle to the manned space lab modules on an on-orbit space station.

It is still another object of the present invention to provide a mobile transport and assembly vehicle that can be anchored to the existing truss of a partially constructed space station and then extend the lower track one bay beyond existing structure whereby the track becomes an assembly jig to facilitate the construction of the next truss bay.

It is yet another object of the present invention to provide a mobile remote manipulator system that can build, repair and perform on a truss space structure without having guide rails coextensive with the truss and thus avoiding the additional mass and design complexity required to include mounting rails on the space station truss structure.

It is another object of this invention to provide a mobile remote manipulator system that is no longer or wider than one bay of the space station truss and thus within dimensional constraints of the space shuttle cargo bay.

It is yet another object of the present invention to function by a self-contained rechargeable power supply which does not require umbilicals or power rails and utilizes power from the space station solar electrical system.

It is another object of the present invention to provide a mobile remote manipulator vehicle system that can be completely controlled by extra vehicular activity astronaut(s).

Another object of the present invention is a mobile remote manipulator vehicle system that is supported by "hard points" of a space truss structure.

STATEMENT OF THE INVENTION

According to the present invention the foregoing and additional objects of the instant invention are attained by providing a mobile remote manipulator vehicle system consisting of three layers. The bottom track layer consists of a square track arrangement corresponding to the dimensions of the outer grid of a square bay space station truss structure. The four rails on the botton track layer lie in a single plane and ride on guide pins on the space station truss structure. The guide pins are integral with truss nodes located at each intersection point of the space station truss structure where the individual struts are connected. This places a truss node with guide pin on each corner of a square strut frame which circumscribes one structural bay of the space station structural truss. These truss nodes correspond with the structural "hard points" in that the space station truss structures ability to support a load is optimized when the load is supported at the intersection of struts where the truss nodes are located.

A track switch is located at each corner of the track on the bottom track layer allowing movement in two orthogonal directions. If a direction change is desired, the four track switches are changed by rotating them ninety degrees allowing translation of the mobile remote manipulator vehicle system in a direction perpendicular to previous movement. The track switches may be positioned manually by the extravehicular astronaut(s), as in the embodiment chosen for illustration and depicted in FIG. 5, or remotely by commanding movement of electrical solenoide from the astronaut foot restraint platforms.

The central motorized layer of the mobile remote manipulator vehicle system has an integral push-pull drive system which propels the vehicle. The drive in the embodiment chosen for illustration is an electric stepper motor connected to a rack and pinion drive chain that either pushes or pulls an extendable draw bar. The extendable push-pull draw bar is also a space station structural bay in length. Two draw bar drive rods are situated on either end of the extendable draw bar so that when the extendable draw bar is fully extended from the vehicle, the draw bar drive rods correspond with the next two truss node guide pins on the space station truss structure. The pins lock into the guide pins and the drive system pulls the mobile remote manipulator vehicle system one bay along the space station truss structure. If further translation is desired then the extendable draw bar is extended and locked on to the next two truss guide pins and the mobile remote manipulator vehicle system is pulled another structure bay length along it journey. This gives the mobile remote manipulator vehicle system an "inch worm" type movement as it translates along the truss.

The drive system may also push itself away from the extendable draw bar and reverse direction. In this mode the extendable draw bar is positioned coterminous with the rails on the bottom track layer so that the draw bar drive rods are locked into the same two guide pins as those supporting one side of the mobile remote manipulator vehicle system. In this position the front two track switches on the mobile remote manipulator vehicle system occupy the same two guide pins as the drive rods on the extendable draw bar. The electric stepper motor then drives the rack and pinion drive to push on the extendable draw bar. The extendable draw bar is precluded from movement, as the drive rods remain locked in the guide pins, resulting in the mobile remote manipulator vehicle system pushing itself one space station truss structure bay away from the fixed extendable push-pull draw bar drive rods. The drive rods are again drawn within the mobile remote manipulator vehicle system. The draw bar drive rods are locked into the new guide pins occupied by the front two track switches and the translation process may be repeated pushing the mobile remote manipulator system another bay length along the truss.

The central layer of the mobile remote manipulator system is the motorized layer. It consists of an extendable draw bar, and drive motor and associated gear train and a rotating drive. The motorized layer is capable of 360 degrees rotation. This rotational ability, when coupled with the bottom track layer's ability to switch between two orthogonal directions, allows bi-directional translation longitudinally and latitudinally along the space station truss structure. This push-pull drive system allows the vehicle to pull itself up against a space truss bay containing a manned lab or other structure and then reverse direction on the central drive layer and push away from the restricted bay. This allows the mobile remote manipulator vehicle system to approach within close proximity to a work site without impeding mobility.

The top layer of the mobile manipulator system is a logistics platform that will serve as a work platform or a materials storage platform. The embodiment chosen for illustration was designed and constructed to assemble and operate on the planned space station truss structure and contains two astronaut controlled foot restraint platforms and a space crane for material handling. This platform is capable of 360 degree rotation independent of the position of the central drive layer or the bottom track layer of the vehicle.

It is interesting to note that when the mobile remote manipulator system is used for assembly of the space station, the bottom track layer can double for an assembly jig. In this mode the astronauts load the space station logistics platform with the unassembled struts for the next truss bay and push the mobile manipulator system onto the last truss bay assembled. The drive rods on the extendable push-pull draw bar are locked into the guide pins and the vehicle is pushed out over empty space where the next space station truss bay will be assembled. In this extended assembly mode the vehicle is supported by four truss structure nodes. Two of the nodes are occupied by the drive rods on the extended push-pull drive bar and the last two truss nodes on the space station truss structure are occupied by the front two switches on the mobile remote manipulator system. The vehicle hangs out over open space in this configuration. The track on the bottom track layer now doubles as an assembly jig. The extravehicular astronaut(s) use these work platforms and the space crane, if necessary, to assemble the truss struts into the next truss bay. The track on the bottom layer of the vehicle holds the struts into exact position facilitating the extravehicular assembly astronaut(s) in the assembly of the next bay.

BRIEF DESCRIPTION OF THE DRAWINGS

A more comprehensive appreciation of the invention and many of the attendant advantages thereof will be readily apparent as the same becomes better understood by reference to the following description when considered in connection with the accompanying drawings wherein:

FIG. 9 is a view similar to FIG. 8 and depicts the guide pin engagement mechanismin the intermediary position of drive rod engaged but not latched;

FIG. 10 is a view similar to FIGS. 8 and 9 and depicts the guide pin engagement mechanism in the guide pin engaged and locked position;

DETAILED DESCRIPTION OF THE INVENTION

Figure 1:
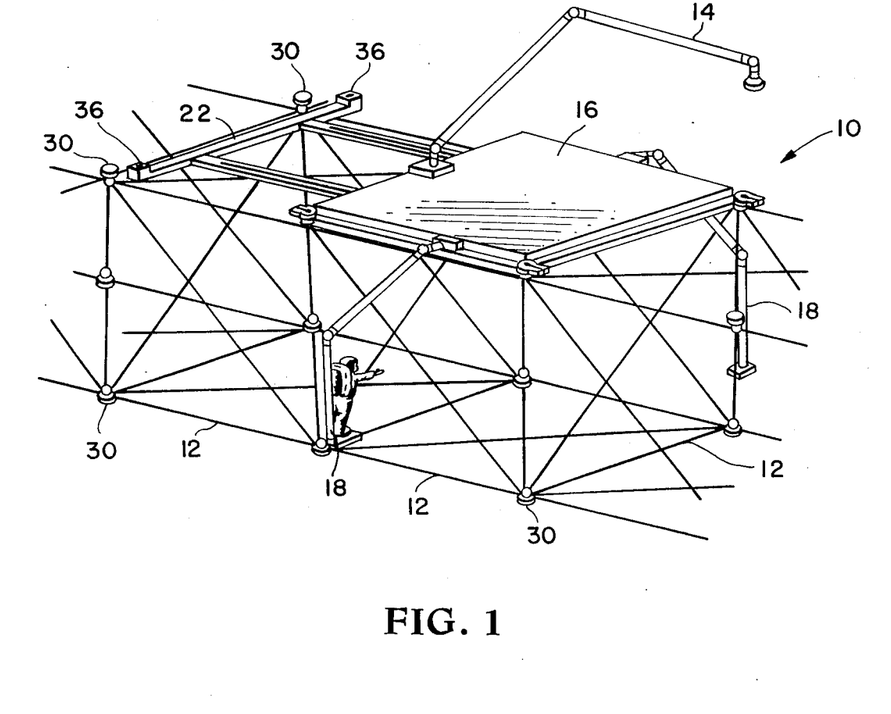
FIG. 1 is a view showing the mobile remote manipulator vehicle system mounted on a square-bay truss structure according to the present invention.

Referring now to the drawings wherein like elements are referred to by the same reference numeral throughout the several views and more particularly to FIG. 1, the numeral 10 generally designates the preferred embodiment of the mobile remote manipulator vehicle system of the present invention, shown mounted on a squrae bay truss structure 12. This embodient has a space crane 14 integral with the logistics platform 16. Spacecrane 14 is of a type known to those skilled in the art and it is contemplated that the space shuttle Remote Manipulataor System (RMS) will be provided with a quick mechanical/electrical disconnect and be available to extravehicular astronauts to utilize on the mobile remote manipulator system as space crane 14. FIG. 1, also reveals two astronaut foot restraint platforms 18. These platforms, 18, will be remotely controlled by the astronaut(s) utilizing them.

Figure 2:
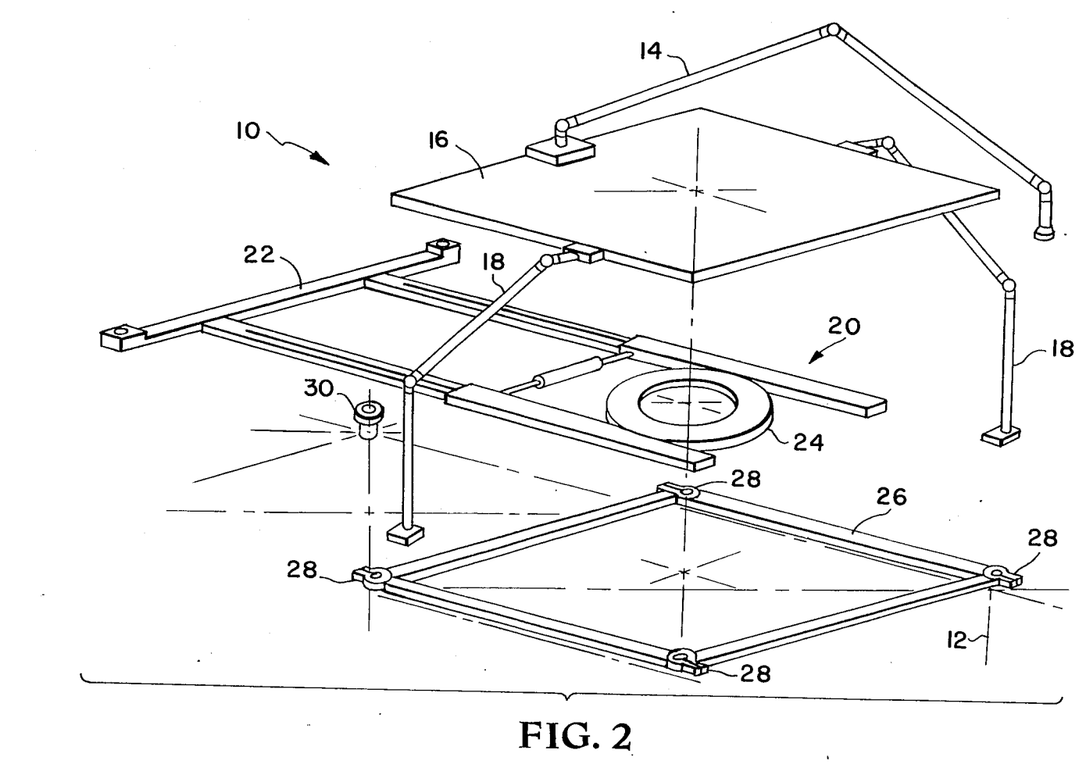
FIG. 2 is an exploded view of the mobile remote manipulator vehicle system shown in FIG. 1 and depicting the tri-layer positioning of the three operational elements.

Turning now to FIG. 2, the unique tri-layer design of the mobile remote manipulator vehicle system 10 may be observed. Numeral 20 designates generally the central motorized layer which functions as the push-pull drive mechanism. An extendable draw bar 22 may be extended from, or drawn internal to, the mobile remote manipulator vehicle system 10 by a rack and pinion drive system. A rotary drive and bearing 24 is operatively spaced within central motorized drive mechanism 20 and provides 360 degree rotation capability to logistics platform 16 as well as the central push-pull drive mechanism 20. Bottom track layer 26 is a square track arrangement mounted in a single plane and has the same dimensions as one bay of the square bay truss structure 12 which supports it. Four track switches 28 are provided, one at each corner of the track arrangement, which correspond with the truss guide pins 30 located at each truss node connecting the struts on the space station truss structure 12. It is important to note that guide pins 30 are located at the structural "hard points" of the space truss and provided complete support of the mobile remote manipulator vehicle system 10 solely from these structural "hard points."

As hereinbefore mentioned, the mobile remote manipulator vehicle system 10 of the present invention is supported only by the space destination structural truss "hard points." The chosen embodiment for illustration is one presently design contemplated for the National Aeronautics and Space Administration's planned space station. The mounting of the truss structure guide pins 30 on the truss nodes can be better understood by reference to FIG. 7. The truss structure guide pins are attached to truss structure node 40 with four standard fasteners (not illustrated). The truss node connection arms 42 attach one each to a truss structural strut in the assembled space station truss structure.

Figure 3:
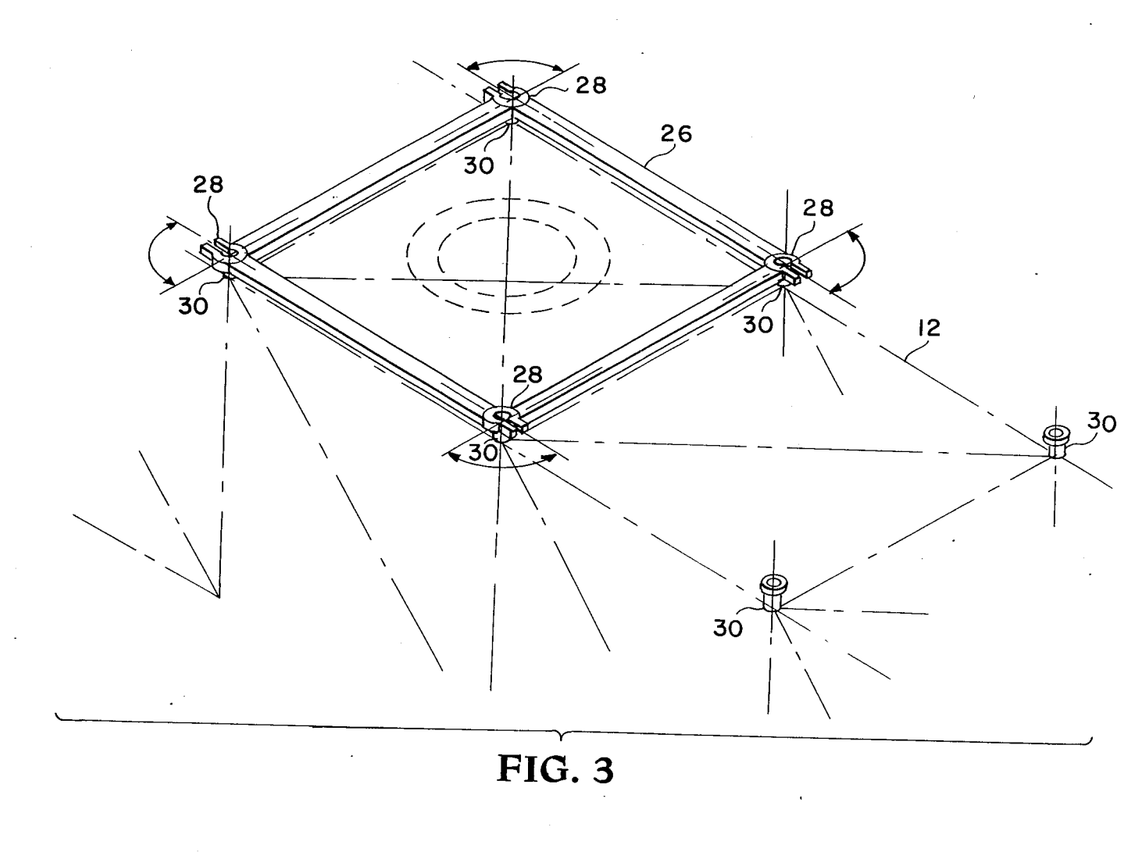
FIG. 3 illustrates the bottom track layer and track switch arrangement of the mobile remote manipulator vehicle system of FIG. 1 in respect to a schematic representation of a square bay truss structure.
Figure 4:
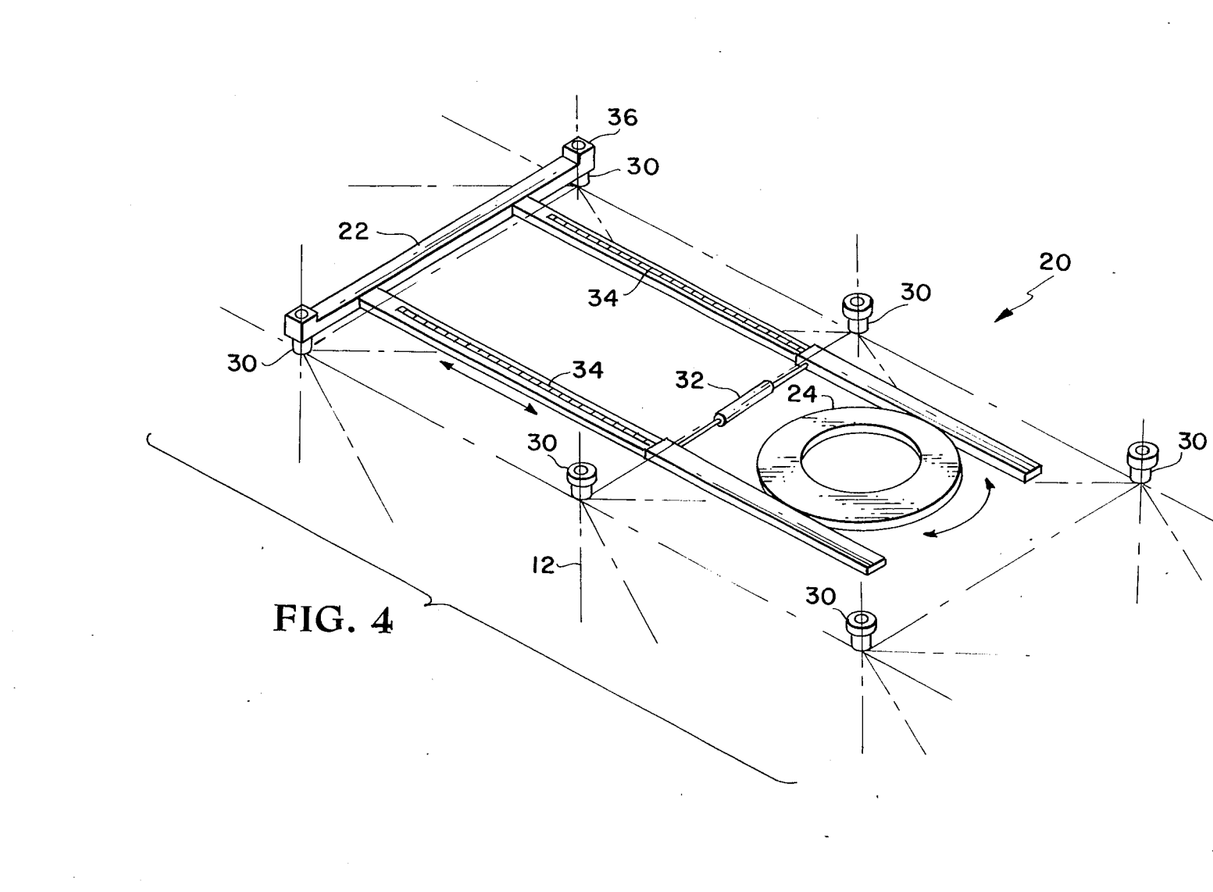
FIG. 4 depicts the push-pull drive mechanism of the vehicle in FIG. 1 highlighting the electric stepper motor and rack and pinion drive.

The mobile remote manipulator vehcile system 10 is capable of translation over the truss structure guide pins 30 in two orthogonal directions. FIG. 3 illustrates the ability of the track switches 28 to be aligned by rotating them 90 degrees so as to correspond to the desired direction of travel. The track switch 28 may be rotated manually, as in the embodiment of the invention chosen for illustration, or controlled remotely by an electrical stepper motor or electrical solenoid. Once track switches 28 are aligned to permit motion in the desired direction, the central motorized push-pull drive mechanism 20, shown in FIG. 4, provides transitional propulsion. An electric stepper motor pinion drive 32 working in conjunction with pinion (not shown) and rack 34 extends the extendble draw bar 22 one truss bay length out from the mobile remote manipulator vehicle system. When extendable guide bar 22 is fully extended the two guide pin engagement mechanisms 36 will be centered over the next two guide pins 30 on the space truss structure. Engagement mechanisms 36 engage the draw bar drive rods in guide pins 30 and lock them in place. The electric stepper motor pinion drive 32 then rotates the rack 34 pulling the mobile remote manipulator vehicle system toward extendable draw bar 22 until the draw bar is internal to the machine and the machine has completely moved from a position centered over one bay of truss structure 12 to one centered over the next sequential bay. Thus, the translation of the mobile remote manipulator system is "inch worm" fashion.

Figure 12:
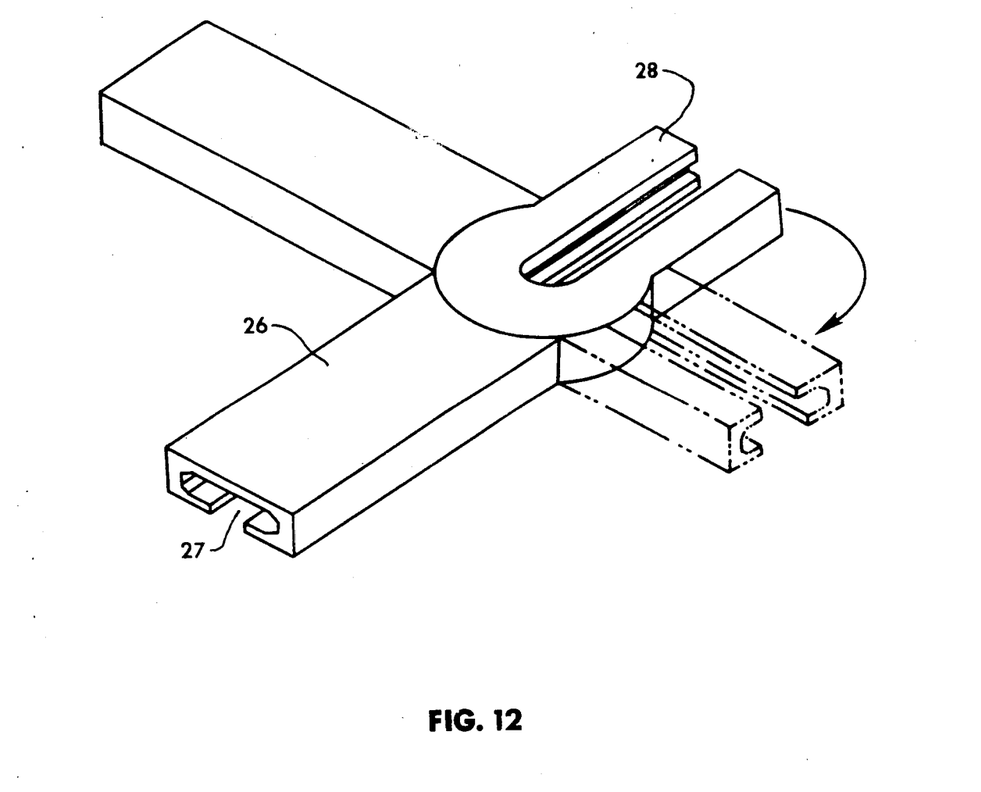
FIG. 12 is an isometric view of the track and track switches.
Figure 13:
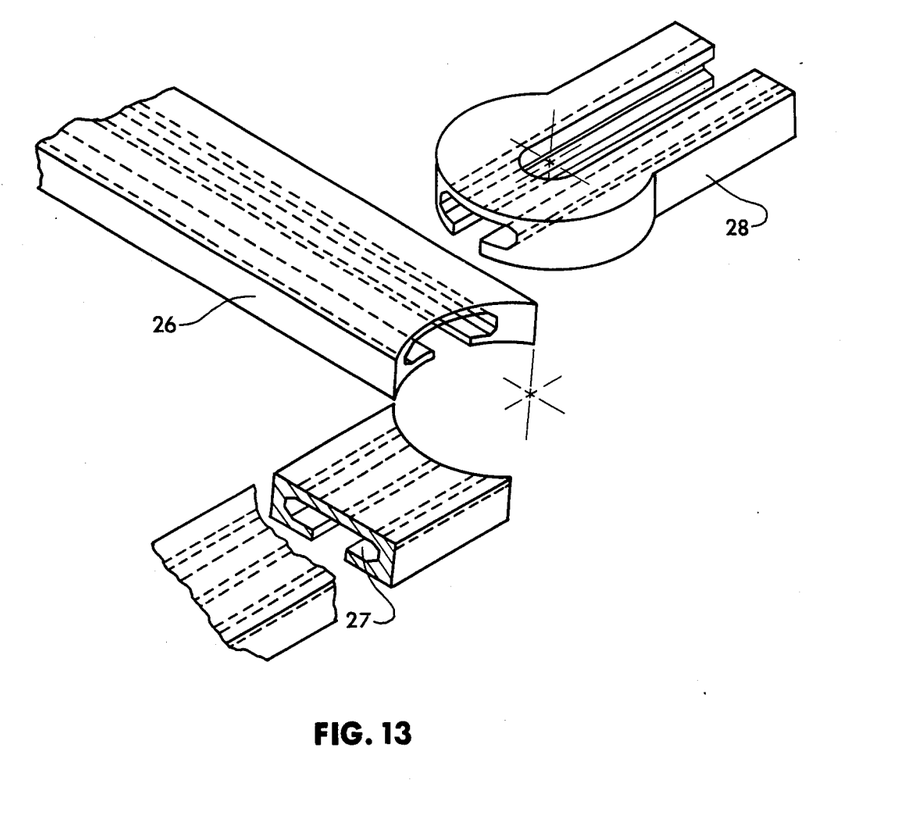
FIG. 13 is an exploded view of the track and track switches of FIG. 12.

Turning now to FIG. 12, the unique arrangement of track switches 28 and track 26 can be seen in relationship to guide pins 30. The track switches 28 are open on both ends as shown in FIG. 12, allowing a guide pin 30 to move through the switch into a slot 27 in track 26. The track slots are constructed to slidably receive the flanged tops of guide pines 30 (shown in FIG. 3); thus the mobile remote manipulator is supported at all times by guide pins 30, which are the hard points of the space station structural bay. When the mobile remote manipulator system is positioned over a structural bay the support is obtained with each track switch 28 resting on four guide pins 30 at each corner of the bay. When the vehicle is transitioning, the guide pins 30 enter track slots 27 and the track slides along the guide pins with the vehicle continuing to obtain support solely from guide pins 30.

When the vehicle is centered over a structure bay, with track switches 28 containing the flanged bell of the four guide pins on each truss corner, a change of direction of the vehicle to one orthogonal to previous travel can be made. The astronauts can manually change each track switch 28 by rotating each 90°. The zero gravity operating environment permits easy rotation of switches 28, even though these switches support the vehicle by resting on the guide pins. After positioning each track switch 28 to correspond with the new orthogonal direction desired, the electric stepper motor pinion drive 32 rotates the central motorized layer 90° to correspond to the new desired direction of travel. Draw bar 22 can then be extended in the new direction, lock on to the corresponding guide pins 30 and then pull the vehicle one structural bay in the new direction.

The embodiment chosen for illustration employs manually operated track switches 28, as shown in FIG. 12, and used on the prototype vehicle tested by the National Aeronautics and Space Administration. It is anticipated that the operational model used to construct the planned space station will employ solenoid operated track switches of a type known to those skilled in the art. This will allow the extravehicular astronauts to operate the switches remotely from their astronaut foot restraint platforms 18.

Figure 11:
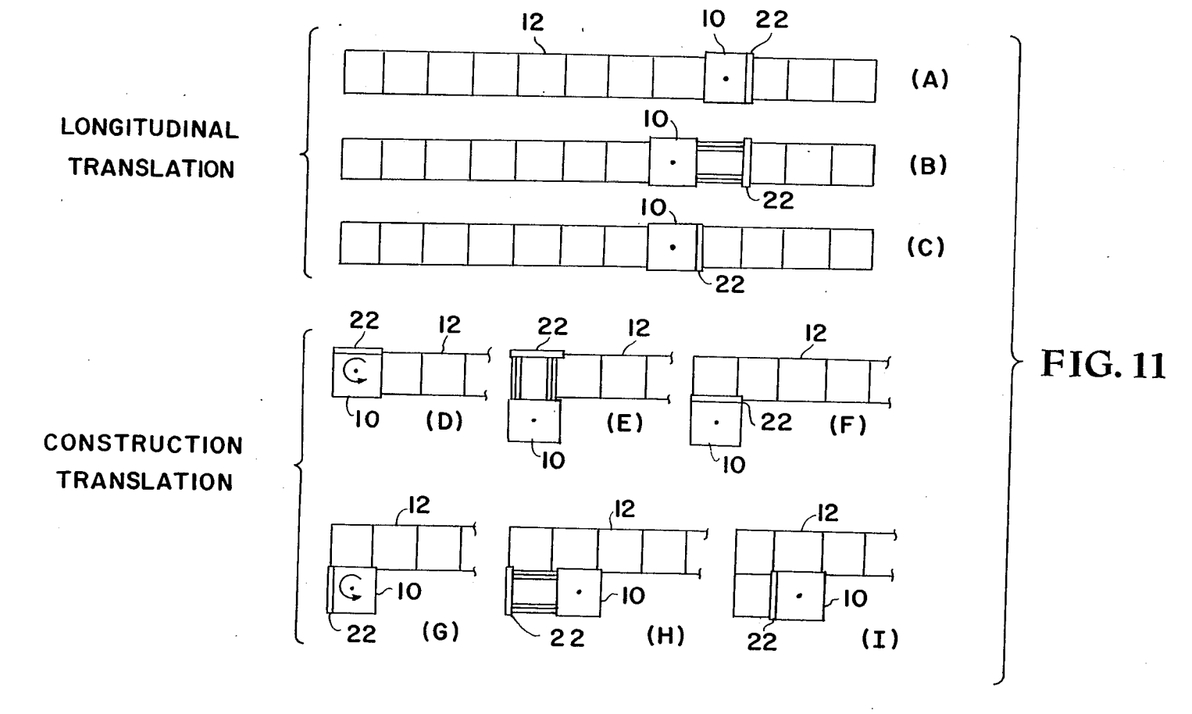
FIG. 11 is a schematic representation of vehicle movement.

Turning now to FIG. 11, a special space truss construction feature may be envisioned. An especially salient feature of the mobile remote manipulator system is the ability to station itself over the last completed bay in truss beam 12 and then push itself off into space with the electric stepper motor pinion drive. In this procedure, the four truss structure guide pins 30 located on each corner truss node of the last completed structural bay, would support the vehicle. The fully extended drive bar 22, with engagement mechanisms 36 down and locked into the two inside guide pins 30 of the last structural bay, would provide two of the four attachment points. The two tack switches 28 on the front of the vehicle would attach to the two guide pins 30 on the outside corners of the last completed bay to provide the other two of the four point support of the vehicle in the construction mode. In this position, all of the vehicle is extended over open space except for the front track section affixed to two guide pins 30 and the draw bar 22 attached to two other guide pins 30. Three sides of the track section 26 are now positioned over the open space which will contain the next structural bay of space truss 12. Extravehicular activity astronaut(s) can now assemble the struts forming the next bay by inserting two new guide pins 30 integral with their respective truss nodes 40 into the two free track switches. The new truss stringers can now be attached to the new nodes and the nodes on the end corners of the last completed bay, thus forming a new structural bay. Once the new bay is completed, guide pin engagement mechanisms 36 are released from their respective truss structure guide pins 30 and extendable draw bar 22 is withdrawn internal to the vehicle. This completes the construction cycle leaving the vehicle supported by the four guide pins located at each corner of the newly constructed truss structure bay. It is worthy of note that the zero gravity operating environment obviates special design strength requirements which would be necessary to operate the vehicle in the extended construction mode in earth gravity.

The "inch worm" translation of the mobile remote manipulator vehicle system of the present invention may be more clearly understood by viewing FIG. 11. The vehicle 10 begins longitudinal movement along space station truss structure 12 starting from a fixed position shown in FIG. 11 configuration (A) atop the fourth truss bay from the left end of truss structure 12. The extendable draw bar 22 is locked to truss structure 12 and the push-pull drive mechanism 20 pushes the vehicle 10 to a position atop the adjacent truss bay depicted in configuration (B), FIG. 11. The extendable draw bar 22 is then released from the truss and drawn internal to vehicle 10 completing one cycle of longitudinal translation (configuration C, FIG. 11). It is important to note that the push-pull drive mechanism 20 can reverse and starting from position C, FIG. 11, extend draw bar 22 as shown in FIG. 11, configuration B and then pull the vehicle 10 back to the fourth truss bay on truss structure 12 as shown in configuration A of FIG. 11.

FIG. 11 is also helpful in understanding the construction mode of the present invention. The construction translation sequence of FIG. 11 begins with the mobile remote manipulator vehicle system 10 positioning itself atop the last bay of a single-bay, square truss structure longitudinal beam and then rotating the central motorized layer 20 and logistics platform 16 ninety degrees (D of FIG. 11). Extendable draw bar 22 then pushes vehicle 10 out over open space as depicted in (E) of FIG. 11. The bottom track layer 26 (not shown in FIG. 11) is now used for a construction jig and a new space station structural bay is constructed under the vehicle 10. Extendable draw bar 22 is drawn internal to vehicle 10 as shown in F of FIG. 11. The logistics platform 16 and central motorized layer 20 are again rotated ninety degrees as shown in G of FIG. 11 and vehicle 10 is pushed out over open space again for construction of another truss bay (H of FIG. 11). I of FIG. 11 shows vehicle 10 pulling extendable draw bar 22 internal exposing the space station truss bay first completed.

Figures 7, 8:
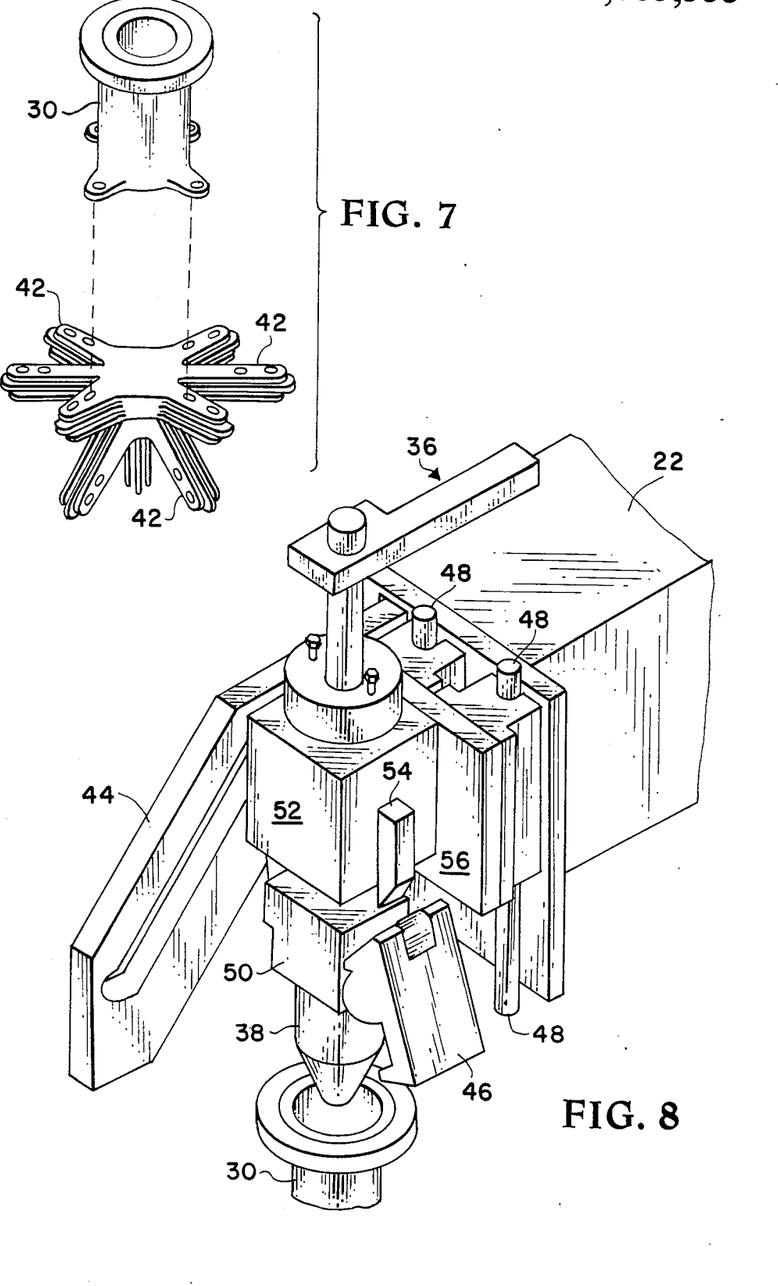
FIG. 7 is an exploded view of an exemplary space station structural truss node showing the mounting position of a truss structural guide pin of the truss structure of FIG. 1.
FIG. 8 depicts a guide pin engagement mechanism for the mobile remote manipulator vehicle system of FIGS. 1 and 2 in the drive rod up and unlatched position.

Turning now to FIG. 8, the operation of the drive bar engagement mechanism 36 located on either side of extendable draw bar 22 may be more clearly understood. When the extendable draw bar 22 is either fully extended or completely withdrawn within the mobile remote manipulator system 10, the draw bar drive rods 38 will be centered over two corresponding guide pins 30. To engage the drive rods 38, the engagement mechanism actuator cam 44 is moved toward the extendable draw bar 22 forcing the slider mechanism 56 down toward guide pin 30. Slider mechanism 56 rides on two engagement mechanism slider rails 48. A spring is located between upper drive rod trunion 52 and lower drive rod trunion 50.

FIG. 9 shows engagement mechanism actuator cam 44 in the engaged but unlatched position. Note that drive rod 38 is completely engaged in guide pin 30, but latch 46 is not engaged with pin 30. FIG. 10 reveals the engagement mechanism actuator cam 44 completely in the engaged and locked position. Cam movement has completely lowered slider mechanism 56, forcing the upper drive rod trunion 52 upon the lower drive rod trunion 50 compressing a spring located between the trunions but not shown. The latch actuator cam 54, in the same motion, forces latch 46 to rotate around the guide pin 30 latching the draw bar drive rod 38 firmly within the pin. The spring between the upper and lower trunions 52, 50 is compressed and when the engagement mechanism actuator cam 44 is moved to the unlatch position the spring will force the upper drive rod trunion 52 and latch cam 54 off the lower drive rod trunion 50 while rotating latch 46 free of the truss structure guide pin 30 as shown in FIG. 9.

The invention described herein employed a manually operated engagement mechanism but it is anticipated that an electric stepper motor and rack and pinion drive or electrical solenoids may be used to drive cam 44 on the unit used to construct the space station.

Figures 5, 6:
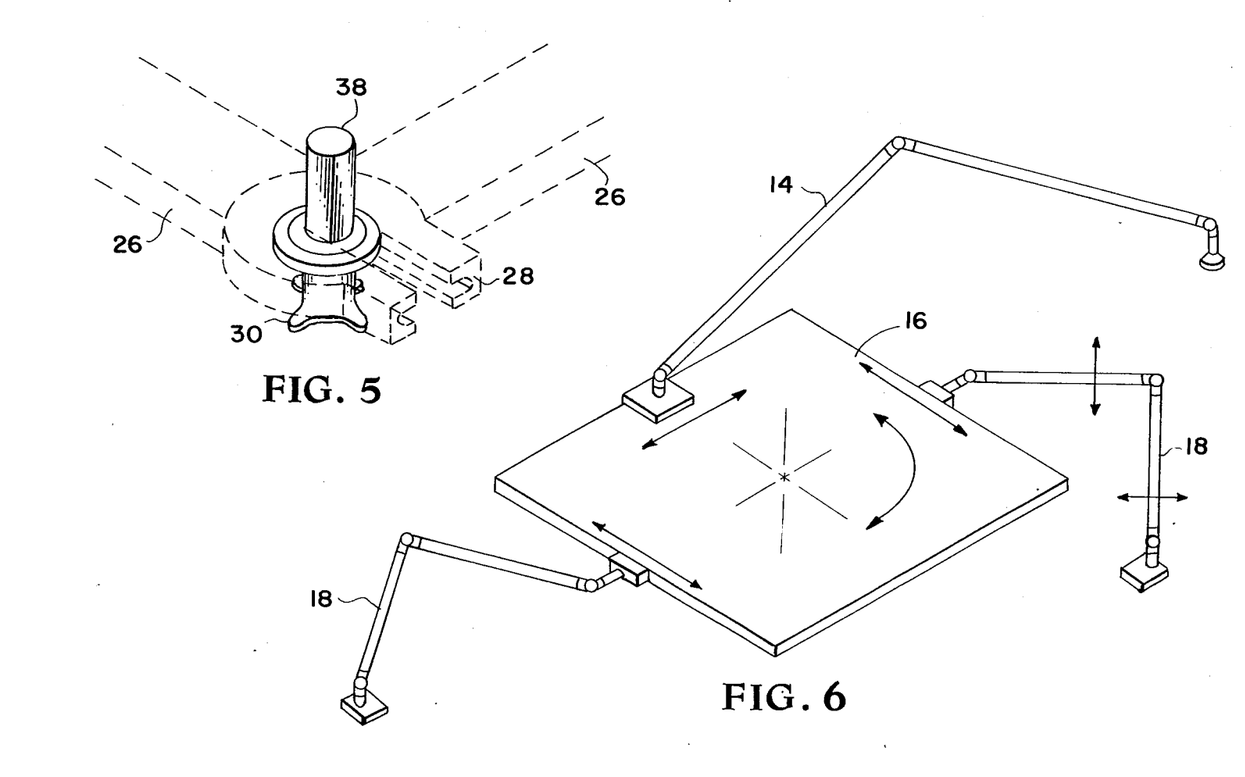
FIG. 5 illustrates the interrelationship of parts when a drive rod shown in FIG. 4 is locked onto the same truss guide pin as a corner switch.
FIG. 6 is a view of the logistics platform and associated peripheral parts of the manipulator vehicle system shown in FIGS. 1 and 2.

An important feature of the mobile remote manipulator system is the ability of a draw bar drive rod 38 to latch onto the same truss structure guide pin 30 occupied by a track switch 28 as shown in FIG. 5.

The top layer of the mobile remote manipulator system is a logistics platform 16 shown in FIG. 6. The logistics platform 16 is capable of 360° rotation in respect to the bottom track layer 26 and central push-pull drive mechanism 20. A rotary drive and bearing assembly, FIG. 4, designated by reference numeral 24, provides rotational torque for the platform. The rotating drive is a conventional drive and may be procured commercially. FIG. 6 depicts an embodiment of the present invention with two astronaut foot restraint platforms 18 mounted on opposing sides of the logistics platform 16. It is anticipated that the astronaut foot restraint platforms 18 will have full control capabilities and as indicated in FIG. 6, have omnidirectional functional capability. Space crane 14 depicted in the drawings is a facsimile of the present day space shuttle remote manipulator system as herinbefore mentioned and will be fully controllable by the extravehicular activity astronaut(s) using foot restraint platforms 18.

Numerous variations and modifications of the invention will be readily apparent to those skilled in the art in the light of the above teachings. Thus, within the scope of the appended claims, the invention may be practiced other than as specifically described herein.

What is claimed as new and desired to be secured by Letters Patent of the United States is:

1. A mobile remote manipulator system providing an assembly and logistics platform adapted for translation about large square bay truss structures, comprising in combination:
   a moveable track layer adapted for releasable attachment to a truss structure,
   a logistics platform in operative spaced engagement with said track layer,
   an intermediate motorized layer rotatably disposed between and in operative engagement with said track layer and said logistics platform layer,
   said motorized layer including means releasably, attachable to said truss structure to provide motion to said mobile remote manipulator system along a truss structure.

2. A mobile remote manipulator system according to claim 1 wherein said bottom track layer consists of four tracks arranged in a square configuration, and
   said truss structure contains truss nodes with guide pins; and
   means for releasable attachment of said manipulator system to said truss structure guide pins attached to said truss modes integral with the truss structure.

3. A mobile remote manipulator system according to claim 2 including means to switch direction of motion of said track layer and consisting of: four track switches located at each corner of the square track arrangement and adapted for alignment to permit motion over said structural guide pins, said track switches being selectively rotatable 90 degrees in either direction to change the direction of rotation of said track layers.

4. A mobile remote manipulator system according to claim 3 wherein said four track switches are adapted for selective 90° rotation when centered over said structural guide pins thereby permitting translation of said mobile system in two orthogonal directions.

5. A mobile remote manipulator system according to claim 2 including said motorized layer adapted for push-pull propulsion of said system and providing a directional capability to said mobile remote manipulator system.

6. A mobile remote manipulator system according to claim 5 wherein said push-pull drive mechanism is an electric stepper motor integral with a rack and pinion drive.

7. A mobile remote manipulator system according to claim 6 including an extendable push-pull draw bar containing two drive rods, and
   operationally connected to said electric stepper motor and rack and pinion drive.

8. A mobile remote manipulator system according to claim 7 including:
   an extendable push-pull draw bar containing: two draw bar drive rods mounted on said draw bar ends and of proper dimensions to correspond with the space truss structure truss nodes.

9. A mobile remote manipulator system according to claim 7 wherein said push-pull drive mechanism has 360° rotational capability relative to said bottom track layer and said logistics platform permitting movement in four directions.

10. A mobile remote manipulator system according to claim 7 wherein said electric stepper motor and said extendable draw bar has 360° rotational capability relative to said bottom track layer and said logistics platform permitting system movement in four directions.

11. A mobile remote manipulator system according to claim 1 wherein said logistics platform is in operative spaced engagement with said means of propulsion and said bottom track layer, and attached by a central pivot permitting 360 degree rotation with respect to said means of propulsion and said bottom track layer.

12. A mobile remote manipulator system according to claim 11 wherein said logistics platform contains a space crane.

13. A mobile remote manipulator system according to claim 11 wherein said logistics platform has integral: two astronaut foot restraint positioning arms attached one each side perpendicular to the axis of said extendable push-pull draw bar.

14. A mobile remote manipulator system according to claim 7 including means for releasable engaging and latching of said draw bar drive rods to the truss structure guide pins.

* * * * *